United States Patent
Arad et al.

(10) Patent No.: US 9,537,771 B2
(45) Date of Patent: Jan. 3, 2017

(54) EXACT MATCH HASH LOOKUP DATABASES IN NETWORK SWITCH DEVICES

(71) Applicant: Marvell Israel (M.I.S.L) Ltd., Yokneam (IL)

(72) Inventors: Carmi Arad, Nofit (IL); Gil Levy, Hod Hasharon (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 279 days.

(21) Appl. No.: 14/012,834

(22) Filed: Aug. 28, 2013

(65) Prior Publication Data

US 2014/0301394 A1 Oct. 9, 2014

Related U.S. Application Data

(60) Provisional application No. 61/808,323, filed on Apr. 4, 2013.

(51) Int. Cl.
*H04L 12/743* (2013.01)
*H04L 12/935* (2013.01)
*G06F 17/30* (2006.01)

(52) U.S. Cl.
CPC ......... *H04L 45/7453* (2013.01); *G06F 17/303* (2013.01); *G06F 17/30424* (2013.01); *H04L 49/3009* (2013.01)

(58) Field of Classification Search
CPC .............. H04L 45/7453; H04L 49/3009; G06F 17/3033; G06F 17/30424
See application file for complete search history.

(56) References Cited

U.S. PATENT DOCUMENTS

| | | |
|---|---|---|
| 5,032,987 A | 7/1991 | Broder et al. |
| 6,035,107 A | 3/2000 | Kuehlmann et al. |
| 6,249,521 B1 | 6/2001 | Kerstein |
| 6,363,396 B1 | 3/2002 | Klots et al. |
| 6,430,170 B1 | 8/2002 | Saints et al. |
| 6,614,758 B2 | 9/2003 | Wong et al. |
| 6,735,670 B1 | 5/2004 | Bronstein et al. |

(Continued)

OTHER PUBLICATIONS

IEEE Std 802.1Q, 2003 Edition, "IEEE Standards for Local and Metropolitan area networks—Virtual Bridged Local Area Networks," *The Institute of Electrical and Electronics Engineers, Inc.*, 327 pages (May 7, 2003).

(Continued)

*Primary Examiner* — Khaled Kassim

(57) ABSTRACT

In a method for populating a forwarding table, a first hash function is applied to a lookup key to generate a first hash value, a second hash function is applied to the lookup key to generate a second hash value, and a third hash function is applied to the lookup key to generate a third hash value. An offset is determined based on the first hash value and the second hash value. A location for inserting the lookup key is determined based on the offset and the third hash value. It is determined whether the lookup key can be inserted into the forwarding table at the determined location without colliding with a key previously stored at the determined location. When it is determined that the lookup key can be inserted, the lookup key and forwarding information associated with the lookup key are inserted at the determined location.

8 Claims, 10 Drawing Sheets

(56) References Cited

U.S. PATENT DOCUMENTS

| | | |
|---|---|---|
| 6,973,082 B2 | 12/2005 | Devi et al. |
| 7,190,696 B1 | 3/2007 | Manur et al. |
| 7,280,527 B2 | 10/2007 | Basso et al. |
| 7,346,706 B2 | 3/2008 | Rezaaifar et al. |
| 7,539,750 B1 | 5/2009 | Parker et al. |
| 7,554,914 B1 | 6/2009 | Li et al. |
| 7,567,567 B2 | 7/2009 | Muller et al. |
| 7,580,417 B2 | 8/2009 | Ervin et al. |
| 7,613,209 B1 | 11/2009 | Nguyen et al. |
| 7,623,455 B2 | 11/2009 | Hilla et al. |
| 7,639,614 B2 | 12/2009 | Nakagawa et al. |
| 7,796,594 B2 | 9/2010 | Melman et al. |
| 7,821,925 B2 | 10/2010 | Davies |
| 7,821,931 B2 | 10/2010 | Swenson et al. |
| 7,898,959 B1 | 3/2011 | Arad |
| 7,969,880 B2 | 6/2011 | Yano et al. |
| 7,979,671 B2 | 7/2011 | Aviles |
| 8,238,250 B2 | 8/2012 | Fung |
| 8,243,594 B1 | 8/2012 | Fotedar et al. |
| 8,274,971 B2 | 9/2012 | Battle et al. |
| 8,339,951 B2 | 12/2012 | Scaglione |
| 8,355,328 B2 | 1/2013 | Matthews et al. |
| 8,364,711 B2 | 1/2013 | Wilkins et al. |
| 8,503,456 B2 | 8/2013 | Matthews et al. |
| 8,587,674 B2 | 11/2013 | Iwata |
| 8,614,950 B2 | 12/2013 | Roitshtein et al. |
| 8,625,594 B2 | 1/2014 | Safrai et al. |
| 8,660,005 B2 | 2/2014 | Roitshtein et al. |
| 8,756,424 B2 | 6/2014 | Roitshtein et al. |
| 8,792,497 B2 | 7/2014 | Rajagopalan et al. |
| 8,848,728 B1 | 9/2014 | Revah et al. |
| 2002/0093952 A1 | 7/2002 | Gonda |
| 2003/0210688 A1 | 11/2003 | Basso et al. |
| 2004/0073640 A1 | 4/2004 | Martin et al. |
| 2006/0251109 A1 | 11/2006 | Muller et al. |
| 2007/0280258 A1 | 12/2007 | Rajagopalan et al. |
| 2008/0031263 A1 | 2/2008 | Ervin et al. |
| 2008/0037544 A1 | 2/2008 | Yano et al. |
| 2008/0049774 A1 | 2/2008 | Swenson et al. |
| 2008/0052488 A1 | 2/2008 | Fritz et al. |
| 2008/0181103 A1* | 7/2008 | Davies .............. H04L 47/125 370/230 |
| 2008/0205655 A1 | 8/2008 | Wilkins et al. |
| 2009/0196303 A1 | 8/2009 | Battle et al. |
| 2009/0274154 A1* | 11/2009 | Kopelman .............. H04L 45/00 370/395.32 |
| 2010/0023726 A1 | 1/2010 | Aviles |
| 2011/0013627 A1 | 1/2011 | Matthews et al. |
| 2011/0013638 A1* | 1/2011 | Matthews .............. H04L 45/24 370/395.32 |
| 2011/0013639 A1* | 1/2011 | Matthews .............. H04L 45/00 370/395.32 |
| 2011/0102612 A1 | 5/2011 | Iwata |
| 2011/0134925 A1 | 6/2011 | Safrai et al. |
| 2011/0295894 A1* | 12/2011 | Yoo .................... G06F 21/564 707/776 |
| 2012/0136846 A1* | 5/2012 | Song .................. H04L 45/7453 707/698 |
| 2013/0013880 A1* | 1/2013 | Tashiro .................. H03M 7/30 711/170 |
| 2014/0093073 A1* | 4/2014 | Horgan .............. H04L 9/0861 380/44 |
| 2014/0115167 A1 | 4/2014 | Roitshtein et al. |
| 2014/0160934 A1 | 6/2014 | Roitshtein et al. |

OTHER PUBLICATIONS

IEEE Std 802.1Q—2011 (Revision of IEEE Std.802.1Q-2005), "IEEE Standard for Local and Metropolitan Area Networks—Media Access Control (MAC) Bridges and Virtual Bridged Local Area Networks," *The Institute of Electrical and Electronics Engineers, Inc.*, 1,365 pages (Aug. 31, 2011).

IEEE P802.1ad/D6.0, Draft Amendment to IEEE Std 802.1Q, "IEEE Draft Standard for Local and Metropolitan Area Networks—Virtual Bridged Local Area Networks—Amendment 4: Provider Bridges," *The Institute of Electrical and Electronics Engineers, Inc.*, 60 pages, (Aug. 17, 2005).

IEEE P802.1aq/D4.6, Draft Amendment to IEEE Std 802.1Q-2011, "IEEE Draft Standard for Local and Metropolitan Area Networks—Media Access Control (MAC) Bridges and Virtual Bridged Local Area Networks—Amendment XX: Shortest Path Bridging," *The Institute of Electrical and Electronics Engineers, Inc.*, 363 pages (Feb. 10, 2012).

Raoof et al., "Impact of Depolarization Effects on MIMO Polarized Wireless Configuration," Wireless Communications, Networking and Mobile Computing 2007 (WiCom 2007), pp. 1-4 (Sep. 2007).

Thaler et al., "Multipath Issues in Unicast and Multicast Next-Hop Selection," RFC 2991, The Internet Society, Network Working Group, pp. 1-10 (2000).

U.S. Appl. No. 12/537,078, "Hash Computation for Network Switches," filed Aug. 6, 2009 (Mizrahi et al.).

U.S. Appl. No. 13/115,670, "Methods and Apparatus for Handling Multicast Packets in an Audio Video Bridging (AVB) Network," filed May 25, 2011 (Pannell et al.).

U.S. Appl. No. 13/737,608, "Exact Match Lookup in Network Switch Devices," filed Jan. 9, 2013 (Arad et al.).

U.S. Appl. No. 61/695,520, "Efficient TCAM Architecture," filed Aug. 31, 2012 (Levi et al.).

"Hopscotch Hashing," Wikipedia entry downloaded from http://en.wikipedia.org/wiki/Hopscotch_hashing on Oct. 6, 2014 (3 pages).

Herlihy, et al., "Hopscotch Hashing," *DISC '08 Proceedings of the 22nd International Symposium on Distributed Computing*, pp. 350-364 (Sep. 22, 2008).

Shavit, Nir, "Hopscotch Hashing," PowerPoint Presentation downloaded from http://www.velox-project.eu/sites/default/files/Hopscotch%20Hashing%20talk%20slides.ppt on Oct. 6, 2014 (50 slides).

Levi et al., U.S. Appl. No. 61/695,520, "Efficient TCAM Architecture," filed Aug. 31, 2012.

Arad et al., U.S. Appl. No. 13/737,608, "Exact Match Lookup in Network Switch Devices," filed Jan. 9, 2013.

Peng et al., "Content-Addressable memory (CAM) and its network applications," International IC—Taipei Conference Proceedings, May 2000.

Demetriades et al., "An Efficient Hardware-based Multi-hash Scheme for High Speed IP Lookup," 2008 16th IEEE Symposium on High Performance Interconnects, Aug. 2008.

\* cited by examiner

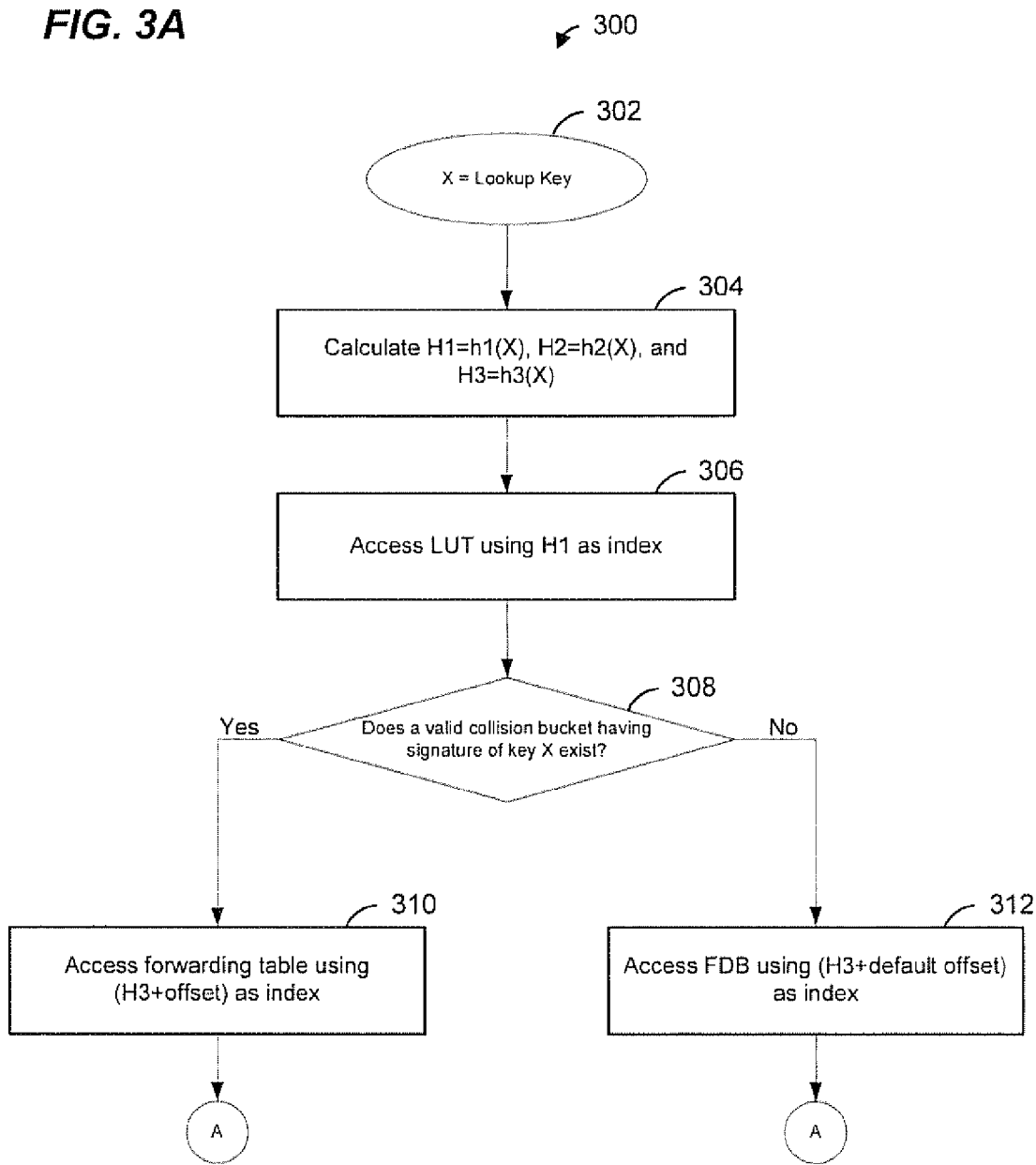

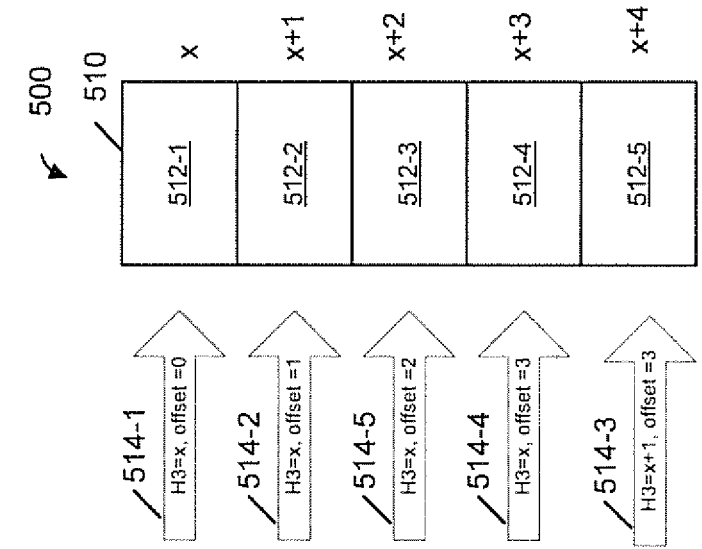
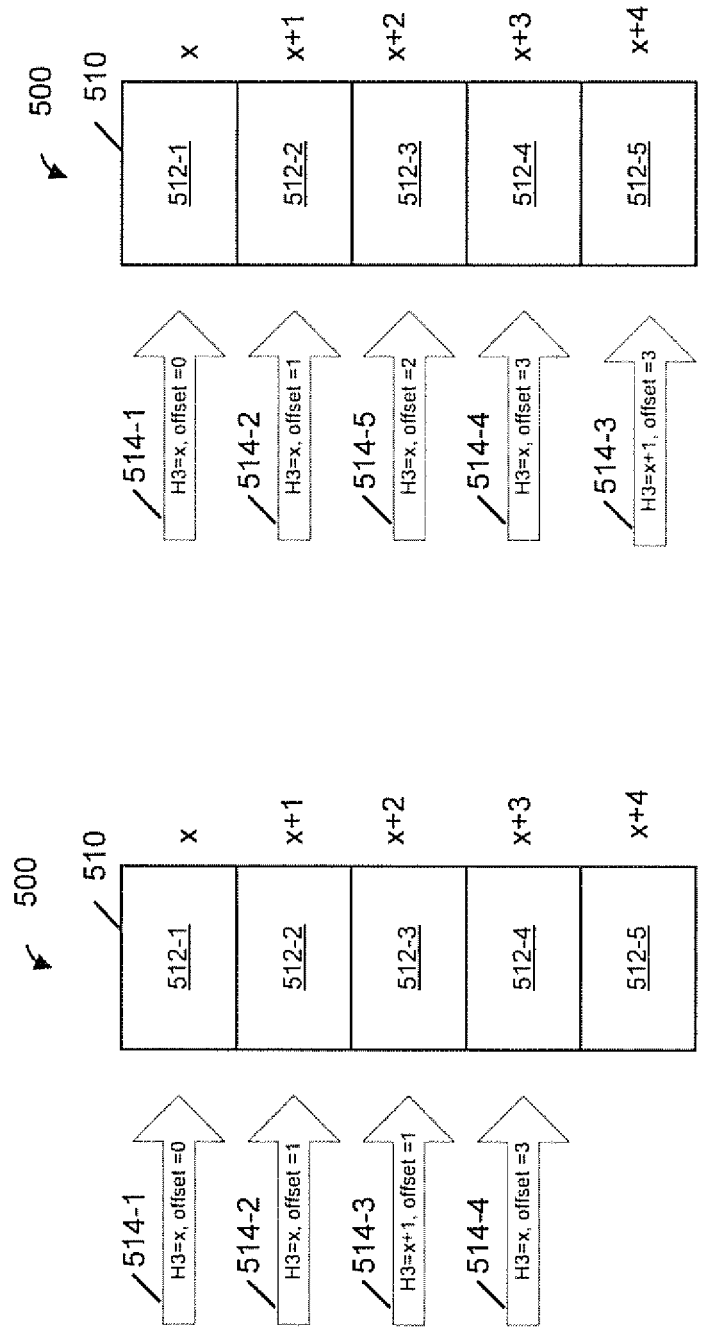
FIG. 5A
FIG. 5B

EXACT MATCH HASH LOOKUP DATABASES IN NETWORK SWITCH DEVICES

CROSS-REFERENCES TO RELATED APPLICATION

The present application claims the benefit of U.S. Provisional Application No. 61/808,323, entitled "Exact Match Hash Algorithm For Very Large Table in Switches," filed on Apr. 4, 2013, the disclosure of which is hereby expressly incorporated herein by reference in its entirety.

FIELD OF TECHNOLOGY

The present disclosure relates generally to network devices, and more particularly, to hash lookup tables in network devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Network devices, such as network switches, routers, edge devices and the like, often employ lookup tables that store various information associated with packets processed by the network devices, and a network device performs lookups in the lookup tables for making various processing decisions during processing of packets by the network device. For example, lookup operations may be performed for packet classification, forwarding decisions, quality of service classifications, policy control list applications, and other processing operations generally performed by network devices. In general, a lookup for a packet is performed according to a key associated with or generated for the packet. The key is used to search a table, for example, and information relevant to the packet (e.g., forwarding information for the packet) is retrieved from an entry in the table identified by the key.

Some lookup tables are implemented using content addressable memory (CAM). A CAM based table generally allows a key provided to the table to be compared against all of the entries of the table, typically in a single comparison cycle, an returns a result that is indicative of which entries match the key. However, CAM based tables generally are expensive in terms of area and power consumption, especially when large size lookup tables are employed.

An alternative implementation of a lookup table utilizes a hash based scheme in which a hash function is applied to a key to determine a location in the hash table at which the key and information associated with the key (e.g., forwarding information) are stored. While hash tables are generally smaller and more efficient compared to CAM implementations, hash tables exhibit inherent collisions when a hash function generates a same hash value for two or more different keys provided to the hash function, and as a result, some keys provided to a hash table cannot be inserted into the hash table. Therefore, a lookup operation for some keys provided to a hash table will not produce a match, even though a key may match an entry. Thus, it is difficult to achieve exact match lookup performance when hash tables are employed.

SUMMARY OF THE DISCLOSURE

In an embodiment, a method for forwarding packets in a network device includes generating, at a hash value generator and based on a lookup key corresponding to a packet, a plurality of hash values including generating at least a first hash value using a first hash function, a second hash value using a second hash function and a third hash value using a third hash function, the third hash function being different from the first hash function and the second hash function. The method also includes searching a lookup table using the first hash value and the second hash value to determine an offset for the lookup key, and searching a forwarding table using the third hash value and the offset determined for the lookup key to select a forwarding entry corresponding to the lookup key. The method additionally includes forwarding the packet to one or more ports of the network device based on the selected forwarding entry.

In another embodiment, a network device for forwarding packets in a network comprises a plurality of ports and a packet processor coupled to the plurality of ports, the packet processor configured to transfer packets received via at least some of the plurality of ports to one or more appropriate ports in the plurality of ports. The packet processor comprises a hash value generator configured to generate, based on a lookup key corresponding to a packet, a plurality of hash values the plurality of hash values including at least a first hash value generated using a first hash function, a second hash value generated using a second hash function and a third hash value generated using a third hash function, the third hash function being different that the first hash function and the second hash function. The packet processor also comprises a lookup unit coupled to a lookup table and to a forwarding table. The lookup unit is configured to search the lookup table using the first hash value and the second hash value to determine an offset for the lookup key, and search the forwarding table using the third hash value and the offset determined for the lookup key to select a forwarding entry corresponding to the lookup key. The packet processor additionally comprises a forwarding engine configured to forward the packet to one or more ports of the plurality of ports based on the selected forwarding entry.

In yet another embodiment, a method for populating a forwarding database in a network device includes generating, at a hash value generator and based on a lookup key, a plurality of hash values corresponding to a packet, including generating at least a first hash value using a first hash function, a second hash value using a second hash function and a third hash value using a third hash function, the third hash function being different than the first hash function and the second hash function. The method also includes determining, with the network device and based at least on the first hash value and the second hash value, an offset, into a forwarding table, for the lookup key. The method further includes determining, with the network device and based on the third hash value and the offset, a location in the forwarding table for inserting the lookup key. The method further still includes determining, with the network device, whether the lookup key can be inserted into the forwarding table at the determined location without colliding with a key previously stored at the determined location. The method additionally includes, when it is determined that the lookup key can be inserted into the forwarding table, inserting the lookup key and forwarding information associated with the lookup key into the forwarding table at the determined location.

In still another embodiment, an apparatus for populating a forwarding database in a network device comprises a hash value generator configured to generate a plurality of hash values based on a lookup key, including at least a first hash value generated using a first hash function, a second hash value generated using a second hash function and a third hash value generated using a second hash function, the third hash function being different that the first hash function and the second hash function. The apparatus also comprises an update unit configured to determine, based on at least the first hash value and the second hash value, an offset into a forwarding table for the lookup key, and determine, based on the third hash value and the offset determined for the lookup key, a location in the forwarding table for inserting the lookup key. The update unit is also configured to determine whether the lookup key can be inserted into the forwarding table at the determined location without colliding with keys previously stored at the determined location, and when it is determined that the lookup key can be inserted into the forwarding table, insert the lookup key and forwarding information associated with the lookup key into the forwarding table at the determined location.

BRIEF DESCRIPTION OF THE DRAWINGS

FIGS. 3A-3B are flowcharts illustrating an example lookup scheme to locate a lookup key in a database and to retrieve information associated with the lookup key from the database, according to an embodiment;

FIGS. 5A-5B are diagrams illustrating an entry rearranging technique applied to a database table, according to an example embodiment.

DETAILED DESCRIPTION

Figure 1:
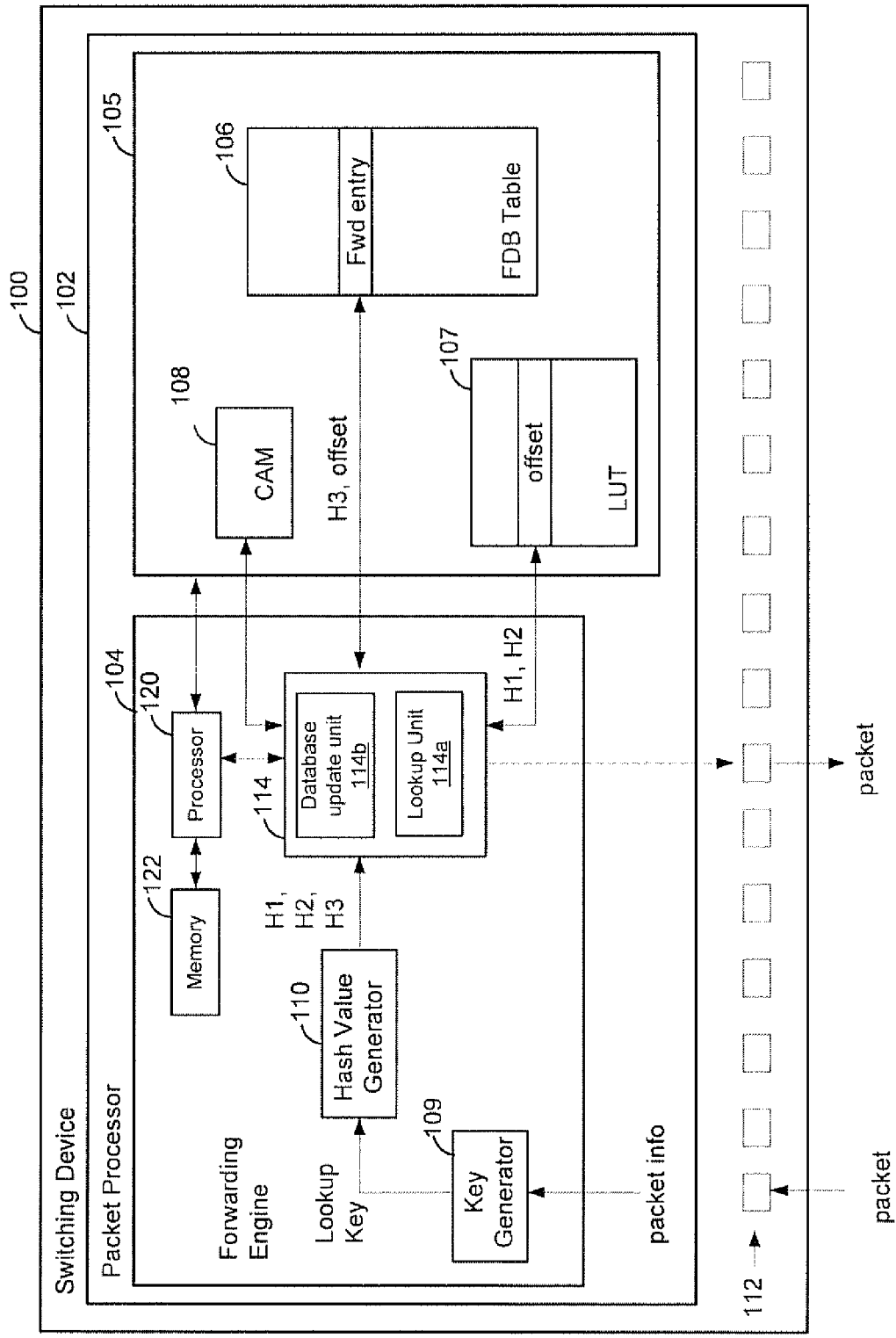
FIG. 1 is a simplified block diagram of an example switching device capable of efficiently resolving collisions in a hash-based lookup database using a multi-hash function scheme, in accordance with an embodiment of the present disclosure.

FIG. 1 is a simplified block diagram of an example switching device 100 capable of efficiently resolving collisions in a hash-based lookup database using a multi-hash function scheme, in accordance with an embodiment of the present disclosure. The switching device 100 is generally a computer networking device that connects two or more computer systems, network segments, subnets, and so on. For example, the switching device 100 is a router, in one embodiment. It is noted, however, that the switching device 100 is not necessarily limited to a particular protocol layer or to a particular networking technology (e.g., Ethernet). For instance, the switching device 100 could also be a bridge, a VPN concentrator, etc.

The switching device 100 includes a packet processor 102 coupled to a plurality of ports 112, and each of the ports 112 is coupled to a communication network (e.g., to a network device within a communication network). In general, the packet processor 102 is configured to process packets received via ingress ports 112, to determine respective egress ports 112 via which the packets should be transmitted, and to transmit the packets via the determined egress ports 112. In some embodiments, the packet processor 102 is configured to receive a packet at an ingress port 112, to store the packet in a memory, to perform processing of the packet while the packet is stored in the memory, to determine one or more egress ports 112 via which the packet should be transmitted, and, after making the forwarding decision, to retrieve the packet from the memory and transmit the packet via the one or more egress ports 112. In some embodiments, the packet processor 102 generates a packet descriptor for the packet, and the packet descriptor, rather than the packet itself, is subsequently processed by the packet processor 102. A packet descriptor includes some information from the packet, such as some or all of the header information of the packet, in an embodiment. In some embodiments, the packet descriptor additionally includes other information such as an indicator of where in the memory the packet is stored. For ease of explanation, the term "packet" hereinafter is used to refer to a packet itself or to a packet descriptor associated with the packet.

The packet processor 102 includes a forwarding engine 104 coupled to a forwarding database 105. In an embodiment, the forwarding database 105 stores associations between destination addresses (for instance, media access control (MAC) addresses, Internet Protocol (IP) addresses, VLANs, multicast addresses, etc) corresponding to network devices connected to ports 112 and the particular ports 112 to which the network devices are connected. According to an embodiment, the forwarding database 105 includes a forwarding table 106, a lookup table 107 and a content addressable memory (CAM) 108 (e.g. binary CAM (BCAM) or ternary CAM (TCAM)). In an embodiment, the forwarding table 106 is implemented as a hash table indexed by hash values generated based on lookup keys (the terms "key" and "lookup key" as used herein are interchangeable). Because hash values are generally shorter than the lookup keys, collisions between two or more lookup keys may result when a hash function generates a same hash value for the two or more lookup keys. In such systems, some lookup keys cannot be inserted into the hash table due to collisions between different keys that hash to same hash values, and some hash tables are, therefore, underutilized. In various embodiments, the forwarding engine 104 is configured to utilize multiple hash values generated for each lookup key to resolve collisions in the forwarding table 106, thereby improving memory utilization of the forwarding table 106.

According to an embodiment, the forwarding engine 104 is configured to generate three hash values, using three different hash functions, for each lookup key, and to selectively utilize the three hash values to determine a memory location at which the lookup key is stored in the forwarding table 106. In this embodiment, a first hash value H1 is utilized to access the lookup table 107 to identify an entry in the lookup table 107 corresponding to the first hash value. A second hash value H2 is utilized to select an offset from one or more offsets associated with the first hash value in the identified entry of the lookup table 107. The selected offset is then applied to a third hash value H3 to determine an index to access the forwarding table 106, and a forwarding entry stored at the determined index is retrieved. Because a third hash value generated for a lookup key is utilized to index the forwarding table 106, wherein the third hash value is generated according to a hash function that is different from hash functions used to generated the first hash value and the second hash value for the lookup key, collisions between different lookup keys that hash to a same first hash value and to a same second hash values are avoided, in at least some situations when the lookup keys do not share the same third hash value. Further, because the lookup table 107, in at least some situations, associates multiple offsets with a first hash value, collisions are avoided between different keys that hash to a same first hash value even when the different keys hash to a same third hash value, in at least some situations. Additionally, in some embodiments, in situations in which collisions between different keys that hash to a same first hash value cannot be resolved by the lookup table 107, for example when the number of such keys stored in the forwarding table 106 exceeds the maximum number of offsets supported by entries of the lookup table 107, such keys are nonetheless inserted into the forwarding table 106 using a default offset, as will be explained in more detail below.

Due to these and other collision resolution techniques described herein, database utilization is generally improved compared to known systems that are unable to resolve such collisions, in at least some embodiments. For example, in some embodiments, lookup key insertion techniques of the present disclosure lead to improved memory utilization as measured by a "first miss" criteria. The first miss criteria is generally defined as the utilization of a hash-based database (i.e., the percentage of entries stored in the database with respect to the maximum number of entries supported by the database) when a first missed insertion of a key is encountered in the database. Accordingly, memory utilization according to first miss criteria equal to or close to 100% results in a highly utilized and efficient hash-based database. Multiple hash value database structures described herein greatly improve memory utilization as measured by the first miss criteria, in at least some embodiments. Additionally, memory utilization as measured by other suitable criteria, such as memory capacity criteria (or percentage of successful insertions resulting from a number of attempted insertions corresponding to the maximum number of entries supported by the database), is also improved, in some embodiments. It should be noted that, according to an embodiment, retrieval of a forwarding entry requires only two memory accesses, a first memory access to retrieve an offset from the lookup table 107 and a second memory access to retrieve the forwarding entry from the forwarding table 106. As a result, by limiting the number of accesses to a memory to a relatively small number (e.g., 2) of accesses, techniques described herein allow for more efficient retrieval of information (e.g., in terms of memory bandwidth at which keys are retrieved from the memory) from a database compared to known multi-hash databases which require greater numbers of memory accesses to retrieve a key. As an example, a conventional multi-hash system may increase memory utilization by generating multiple hash values (e.g., 4 hash values) for a key using a corresponding number of respective hash functions, and accessing the memory with each one of the multiple hash values to locate an entry in a hash table that will allow insertion of the key. In this case, insertion of the key, and accordingly, subsequent retrieval of the key, requires a corresponding number (e.g., 4) of lookup operations. On the other hand, the techniques of the present disclosure ensure that a limited number (e.g. only 2) of lookup operation are required to insert and/or retrieve a key. As a result, the techniques of the present disclosure provide for efficient insertion and retrieval of keys from, for example, relatively large hash-based databases and/or databases stored in a memory external to the switching device by limiting the number of accesses to the memory needed to retrieve the information, while maintaining high memory utilization of the database.

In some embodiments, the forwarding engine 104 includes a processor 120 and a memory 122 that stores instructions executable on the processor 120. In some such embodiments, the processor 120 performs optimization of the forwarding table 106 to further increase utilization of the forwarding table 106. Alternatively or additionally, in some embodiments, the processor 120 is used to aid in resolving collisions between different keys having a same first has value in at least some situations in which the lookup table 107 is unable to resolve such collisions. For example, as will be explained in more detail below, the processor 120 aids in resolving such collisions when the number of such collisions exceeds the maximum number of such collisions supported by the lookup table 107, in some embodiments. Further, in an embodiment, the forwarding engine 104 is configured to utilize additional memory, such as the CAM 108, for storing keys for which collisions could not be resolved.

While the database 105 is generally described herein as a forwarding database that stores associations between the ports 112 of the network device 100 and addresses (e.g., MAC addresses) of network devices connected to the ports 112, the database 105 can generally be any lookup database that stores associations between lookup keys and attributes associated with the lookup keys. For example, in some embodiments, the database 105 is a policy control database that stores associations between a key and one or more policy control actions (e.g., with regard to access control, quality of service, flow measurements, VLAN assignments, etc) to be performed on a packet corresponding to the key. In other embodiments, the database 105 stores other information generally used by the network device 100 to process packets received by the network device 100. Further, while the database 105 is illustrated as external to the forwarding engine 104, the database 105 is included in the forwarding engine 104, in some embodiments. Alternatively, the database 105 is external to the packet processor 102 and/or is external to the switching device 100, in some embodiments. Further, in some embodiments, the table 106 of the database 105 is a relatively large table having one or several millions entries. In an embodiment, the table 106 is implemented in an external (e.g., disposed on an integrated device external to the switching device 100) dynamic random-access memory that is coupled the forwarding engine 104 via a suitable interface (e.g., a double data rate (DDR) interface, a single data rate (SDR) interface, or other suitable interface). In general, however, the database 105 is a database of any suitable size and is implemented using any suitable type of memory (e.g., static random-access memory (SRAM) or another suitable type of memory), in various embodiment. It is also noted that databases and database lookup operations described herein are not limited to network devices and are utilized in other suitable computing devices in other embodiments.

With continued reference to FIG. 1, the forwarding engine 104 includes a key generator 109 coupled to a hash value generator 110. In an embodiment, the key generator 109 receives a packet, or a packet descriptor, and generates a lookup key based on information included in the header of the packet, or in the packet descriptor. For example, the key generator unit 109 generates a lookup key for a packet based on one or more of a destination address (unicast, multicast, or broadcast), a virtual local area network (VLAN) tag, etc., included in or associated with the packet, in other embodiments, the key generator 109 generates a lookup key for a packet based on other information included in or associated with the packet.

The key generator 109 provides the lookup key to the hash value generator 110. The hash value generator 110 receives the lookup key, and generates a plurality of hash values for the lookup key. In an embodiment, the hash value generator generates three hash values, using three distinct hash functions, (e.g., using different generator polynomials, such as 32-bit CRC hash polynomials or other suitable hash polynomials) for the lookup key. The hash value generator 110 provides the generated hash values (e.g., H1, H2 and H3) to a database controller unit 114. In an embodiment, the database controller unit 114 includes a lookup unit 114a and an update unit 114b. The lookup unit 114a performs lookup operations in the database 105 to retrieve forwarding information from the database 105 when this information is needed to make a forwarding decision, for example. The update unit 114b updates the database 105, for example by inserting lookup keys and information associated with the lookup keys into the database 105 when new forwarding information is learned, in an embodiment. Additionally, in some embodiments, the update unit 114b deletes entries from the database 105, for example when entries have not been accessed for a certain period of time.

Referring still to FIG. 1, in an embodiment, the lookup table 107 includes a plurality of entries indexed according to first hash values H1, and each entry includes a plurality of offsets associated with each first hash value H1. Additionally, each of the offsets in an entry of the lookup table 107 is further associated with the second hash value 112 of the particular lookup key to which the offset corresponds, in an embodiment. In operation, the lookup unit 114a identifies an entry in the lookup table 107 corresponding to a lookup key based on the first hash value H1 generated for the lookup key. The lookup unit 114a then selects, based on the second hash value H2 generated for the lookup key, an offset corresponding to the lookup key from the multiple offsets included in the identified entry of the lookup table 107. The lookup unit 114a then applies the selected offset to the third hash value H3 to determine a location in the forwarding table 106 corresponding to the lookup key, and retrieves a forwarding entry from the determined location in the forwarding table 106. In an embodiment, upon retrieving the forwarding entry from the forwarding table 106, the lookup unit 114a compares the lookup key retrieved from the forwarding entry to the lookup key that was used to determine the location of the entry (i.e., the lookup key generated for the packet being processed by the forwarding engine 104). If the retrieved key matches the lookup key, a successful lookup has been performed, and retrieved forwarding information is used to forward the packet being processed by the forwarding engine 104 to one or more ports 112 indicated by the forwarding information. On the other hand, if the retrieved key does not match the lookup key, then the lookup in the forwarding table 106 has failed, in an embodiment. In this case, in an embodiment, the lookup unit 114a utilizes the lookup key to search the CAM 108, and, if a match for the lookup key is found in the CAM 108, obtains forwarding information based on the corresponding entry of the CAM 108. If no match for the lookup key is found in the CAM 108, the forwarding engine 114 "floods" the packet to all or a subset of the ports 112 (e.g., in a layer 2 bridging device), or performs another default or predetermined operation, in an embodiment.

Figure 2:
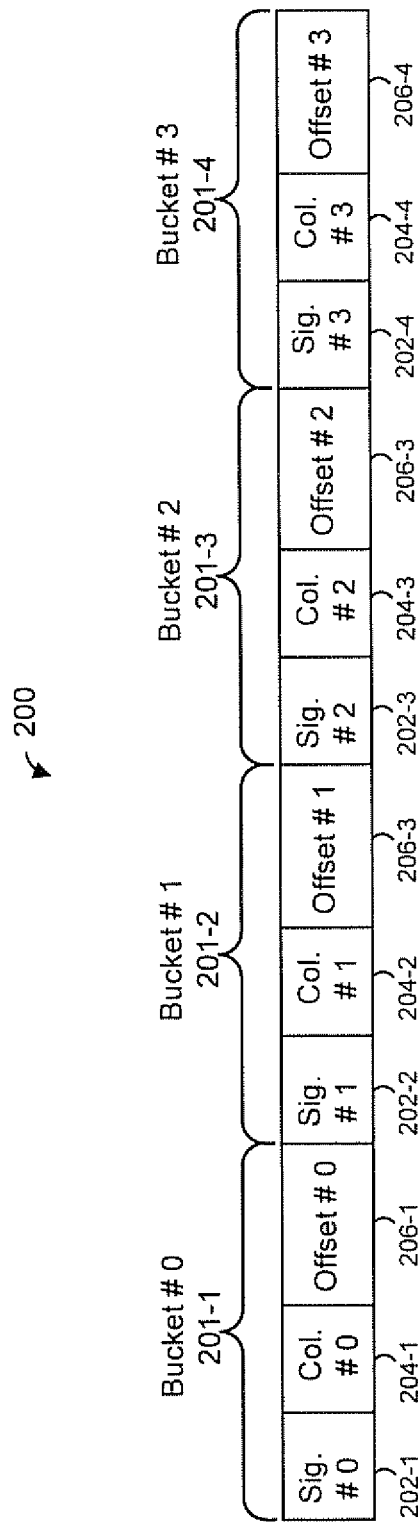
FIG. 2 illustrates an example entry of a lookup table, according to an embodiment.
Figure 3B:
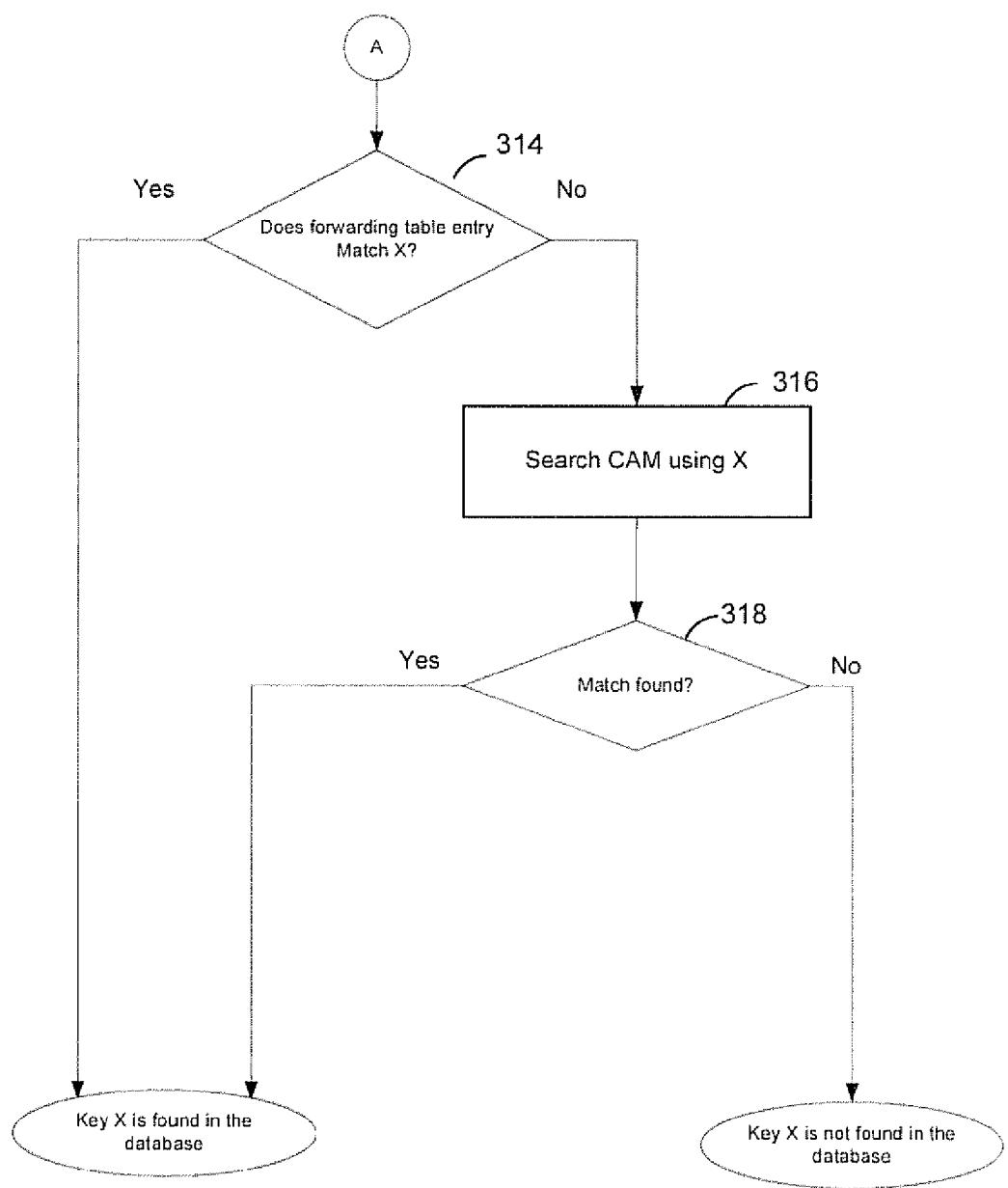

An example lookup scheme implemented by the lookup unit 114a, according to an embodiment, is described bellow in connection with FIGS. 3A-3B. An example update scheme implemented by the update unit 114b, according to an embodiment, is described bellow in connection with FIGS. 4A-4B. Prior to describing the example lookup scheme and the example update scheme, an example entry of the lookup table 107 according to an embodiment is first described in connection with FIG. 2.

FIG. 2 illustrates an example entry 200 of the lookup table 107 of FIG. 1, according to an embodiment. In other embodiments, the lookup table 107 of FIG. 1 includes entries having suitable structures other than the entry 200. The entry 200 includes a plurality of sub-entries or collision buckets ("buckets") 201. The collision buckets 201 generally provide collision resolution for multiple lookup keys that hash to the same first hash value H1, by allowing different offsets to be utilized for the multiple lookup keys. In the embodiment of FIG. 2, each bucket 201 includes a respective signature field 202, a respective collision counter field 204 and a respective offset field 206. The offset fields 206 are used to store respective offsets for different lookup keys that hash to the same first hash value H1, and the signature fields 202 are used to associate the offsets with the particular lookup keys to which the offsets correspond. In an embodiment, a signature fields 202 stores the second hash value H2 corresponding to a key as a signature for selecting the appropriate offset for the key. In this embodiment, upon retrieving the entry 200 from the lookup table 107 based on a first hash value H1 generated for a key, the lookup unit 114a compares the signatures retrieved from the signature fields 202 of the entry 200 to the second hash value H2 generated for the key. In the event that a signature retrieved from a signature field 202 matches the second hash value H2 generated for the key, the lookup unit 114a selects the offset retrieved from the corresponding offset field 206. In the embodiment of FIG. 2, the entry 200 includes four collision buckets 201 and is capable of storing four different offsets and signatures associated with a single first hash value H1. In other embodiments, the entry 200 includes other suitable numbers (e.g., 1, 2, 3, 5, 6, etc.) of collision buckets and, accordingly, is capable of storing other corresponding numbers of offsets and signatures associated with a single hash value H1.

Additionally, in some embodiments, the entry 200 is structured to support resolution of collisions between multiple keys that share both the first hash value H1 and the second hash value H2, but have different third hash values H3. In such situations, the same offset is selected for the multiple keys from the multiple offsets in the entry 200, but the selected offset is applied to the different third hash values H3 leading to different memory locations in the forwarding table 106. In an embodiment, the collision counter fields 203 are utilized to account for the multiple keys for which the offset in the corresponding offset field 206 is being utilized. Such accounting for the multiple keys is utilized as the multiple lookup keys for which the offset is utilized are deleted from the forwarding table 106 so that the collision bucket remains valid until the last one of the multiple lookup keys is removed, as will be explained in more detail below. In an embodiment, each collision counter field 204 includes two bits and is able to account for a maximum of four lookup keys. In other embodiments, collision counter fields of other suitable lengths are utilized. For example, each collision counter field 204 includes a suitable number of bits (e.g., 1, 3, 4, 5, etc. bits) other than two bits, and accordingly is able to account for a different corresponding number of lookup keys that share the corresponding offset.

FIGS. 3A-3B are flowcharts illustrating an example lookup scheme 300 to locate a lookup key in a database and to retrieve information associated with the lookup key from the database, according to an embodiment. In an embodiment, the lookup scheme 300 is implemented in the network device 100 of FIG. 1. For example, the lookup scheme 300 is implemented by the lookup unit 114a of FIG. 1, in an embodiment. In other embodiments, the lookup scheme 300 is implemented in other suitable network devices. Similarly, the network device 100 of FIG. 1 (e.g., the lookup unit 114a of the network device 100) implements a suitable lookup technique other than the technique 300, in some embodiments. For ease of explanation the lookup scheme 300 is described below as being performed by the lookup unit 114a in conjunction with the lookup table 107, the forwarding table 106 and the CAM 108 of FIG. 1.

At block 302, a lookup key X is obtained. In an embodiment, the lookup key X is generated based on information included in or associated with a packet. For example, the lookup key is composed of a destination MAC address and a VLAN tag associated with the packet, in an embodiment. In other embodiments, the key X includes other suitable information associated with a packet.

At block 304, multiple hash values for the key X are generated. In an embodiment, hash values generated at block 304 include a first hash value H1=h1(X), a second hash value H2=h2(X) and a third hash value H3=h3(X), where h1, h2 and h3 are distinct hash functions. The hash functions h1, h2, h3 are implemented using distinct generator polynomials, such as 32 CRC polynomials, for example, in an embodiment. In an example embodiment, the third hash value H3=H1+H2+h3(X). In other embodiments, the third hash value H3 is generated in other suitable manners. In some embodiments, the third hash value H3 is generated independently of the first hash value H2 and/or the second hash value H2. In general, any suitable hash value generation scheme can be utilized to generate the multiple hash values for the key X at block 304.

At block 306, the lookup unit 114a performs a first memory access using the first hash value H1 generated at block 304. In particular, in the first memory access at block 306, the lookup unit 114a accesses the lookup table 107 using the value H1 as an index into the lookup table 107, and retrieves a corresponding entry from the lookup table 107. In an embodiment, the retrieved lookup entry is structured as the entry 200 of FIG. 2. In this embodiment, the retrieved lookup table includes four collision buckets, and each collision bucket includes a respective signature field, a respective collision counter field and a respective offset field. In another embodiment, the retrieved lookup table entry is structured in another suitable manner.

At block 308, the lookup unit 114a analyzes the retrieved entry to determine whether a collision bucket of the retrieved entry includes a signature that matches the second hash value generated for the key at block 304. Further, when a collision bucket having a signature that matches H2 is identified, the lookup unit 114a determines whether the identified collision bucket includes a valid offset in the offset field of the collision bucket. For example, all ones in the offset field (i.e., each bit of the offset field is set to a logic one (1)) of the collision bucket indicate that the offset is invalid, and any other value in the offset field (i.e., one or more of the bits of the offset field is set to a logic zero (0)) of the collision bucket is a valid offset, in an embodiment. In other embodiments, other suitable values of the offset field indicate that the offset in the identified collision bucket is not a valid offset.

If a collision bucket having a signature that matches H2 and having a valid offset is identified at block 308, the lookup scheme continues at block 310, at which the lookup unit 114a performs a second memory access, accessing the forwarding database 106. In the second memory access, the lookup unit 114a accesses the forwarding table 106 using H3 and the offset retrieved from the offset field of the collision bucket identified at block 308. On the other hand, if a valid collision bucket having a signature that matches H2 is not identified at block 308, the scheme 300 continues at block 312, at which the lookup unit 114a performs a second memory access using the H3 and a default offset. In some embodiments, the default offset is configurable. In other embodiments, the default offset is pre-set or pre-determined and is not configurable.

In any event, in the second memory access (at block 310 or at block 312), the lookup unit 114a retrieves a forwarding entry from the forwarding table 106. In an embodiment, the forwarding entry retrieved from the forwarding table 106 includes a key and information associated with the key. Referring now to FIG. 3B, the scheme 300 continues at block 314. At block 314, the lookup unit 114a compares the key in the forwarding entry retrieved from the forwarding table 106 at block 310 or at block 312 to the lookup key X obtained at block 302. In an embodiment, a determination at block 314 that the key in the retrieved entry matches the key X signifies that a successful lookup has occurred. In this case, according to an embodiment, the retrieved information associated with the key, e.g., forwarding information identifying the port (or ports) 112 via which the packet should be transmitted, is used to perform one or more actions on the packet, such as to forward the packet to the identified port (or ports) 112, for example. In some situations, however, it is determined at block 314 that the key in the forwarding entry retrieved from the forwarding table 106 at block 310 or at block 312 does not match the key X obtained at block 302. In this case, the scheme 300 continues at block 316, at which the lookup unit 114a searches the CAM 108 using the key X in an attempt to find at match for the key X in the CAM 108. Alternatively, in another embodiment, the lookup unit 114a searches the CAM 108 in parallel with accessing the forwarding table 106 and/or accessing the lookup table 107, which results in lower latency in cases in which the key is located in the CAM 108, in at least some situations. Example techniques for performing searches in a hash based database in parallel with searches in a CAM based database, utilized in some embodiments, are described in more detail in U.S. Provisional Patent Application No. 61/695,520, entitled "Efficient TCAM Architecture," filed on Aug. 31, 2012, by Levi et al, which is hereby incorporated by reference in its entirety.

In any event, when a match for the key X is found in the CAM 108 ("Yes" at block 318), then a successful lookup in the CAM 108 has occurred. In this case, in an embodiment, the lookup unit 114a retrieves information associated with the key, such as a forwarding entry from a memory location indicated by the entry that matches the key X, for example. In an embodiment, the memory location indicated by the entry that matches the key X is a memory location in the forwarding table 106. For example, each entry in the CAM 108 indicates an index into the forwarding table 106, in an embodiment. In another embodiment, the memory location indicated by the CAM entry that matches the key X is a memory location in a memory other than the forwarding table 106.

On the other hand, if a match is not found in the CAM 108 ("No" at block 318), then the lookup has failed, i.e., the lookup key X was not found in the database. In this case, a suitable action for a failed lookup is taken. The particular action to be taken in a failed lookup situation depends on a particular embodiment and/or scenario, For example, in one embodiment and/or scenario, the forwarding engine 104 floods the packet to all of the ports 112 (e.g., in a layer 2 bridging device). As another example, in another embodiment and/or scenario, a process to insert the key X and information associated with the key X into the database is initiated. Additionally or alternatively, other suitable default or predetermined operations are performed in the case of a failed lookup, in other embodiments.

Figure 4A:
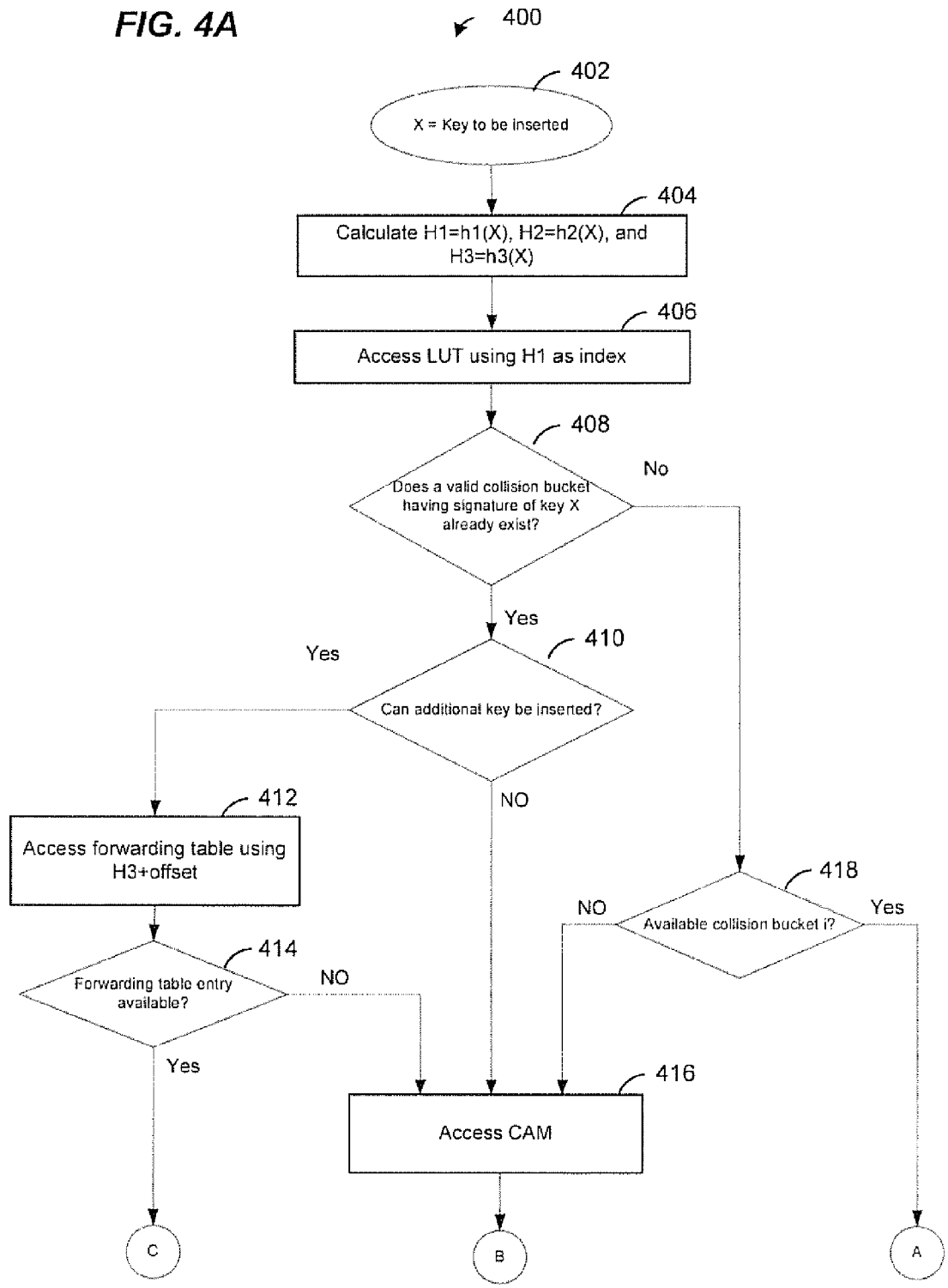
FIGS. 4A-4B are flowcharts illustrating an example update scheme 400 to insert a lookup key and information associated with the lookup key into a database, according to an embodiment.
Figure 4B:
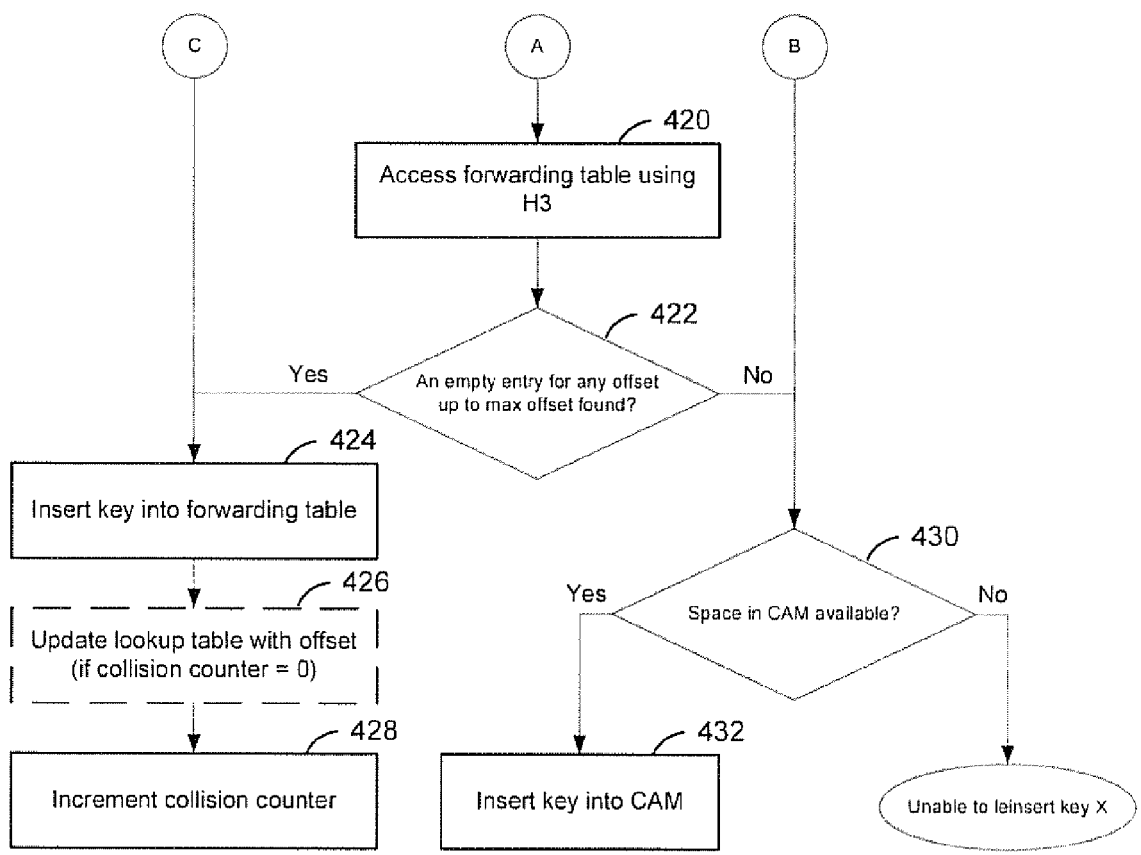

FIGS. 4A-4B are flowcharts illustrating an example update scheme 400 to insert a lookup key and information associated with the key into a database, according to an embodiment. In an embodiment, the update scheme 400 is implemented in the network device 100 of FIG. 1. For example, the update unit 114b of FIG. 1 entirely or partially implements the update scheme 400, in an embodiment. In other embodiments, the update scheme 400 is implemented in other suitable network devices. Similarly, the network device 100 of FIG. 1 (e.g., the update unit 114b of the network device 100) implements a suitable update scheme other than the update scheme 400, in some embodiments. For ease of explanation, the update scheme 400 is described below as being performed by the update unit 114b in conjunction with the forwarding table 106, the lookup table 107 and the CAM 108 of FIG. 1.

At block 402, a lookup key X to be inserted into the database is obtained. In an embodiment, the lookup key X is generated based on information included in or associated with a packet for which a destination address has been linked to a particular port (or ports) 112. The lookup key X is composed of, for example, one or more of a destination MAC address and a WAN tag which have been linked to a particular port (or ports) 112, in an embodiment. In other embodiments, the key X includes other suitable information included in or associated with the packet.

At block 404, multiple hash values for the key X are generated. In an embodiment, hash values generated at block 304 include a first hash value H1=h1(X), a second hash value H2=h2(X) and a third hash value H3=h3(X), where h1, h2 and h3 are distinct hash functions. The hash functions h1, h2, h3 are implemented using distinct or related generator polynomials, such as 32 CRC polynomials, in some embodiments. In an example embodiment, the third hash value H3=H1+H2+h3(X). In other embodiments, the third hash value H3 is generated in other suitable manners. In some embodiments, the third hash value H3 is generated independently of the first hash value H2 and/or the second hash value H2. In general, any suitable hash value generation scheme can be utilized to generate the multiple hash values for the key X at block 404.

At block 406, the update unit 114b accesses the lookup table 107 using the first hash value H1 as an index into the lookup table 107. At block 408, the update unit 114b determines whether a valid collision bucket having a signature corresponding to the key X already exists in the lookup table 107 in the entry accessed at block 406. In an embodiment, to determine whether a valid collision bucket having a signature corresponding to the key X exists in the entry accessed at block 406, the update unit 114b compares the signature fields of the collision buckets in the lookup table entry to the second hash value H2. When a collision bucket having a signature that matches the second hash value H2 is identified, the update unit 114b determines whether the identified collision bucket includes a valid offset in the offset field of the collision bucket. For example, all ones in the offset field of the collision bucket (i.e., each bit of the offset field is set to a logic one (1)) indicate that the offset is invalid, and any other value in the offset field of the collision bucket (i.e., one or more of the bits of the offset field is set to a logic zero (0)) corresponds to a valid offset, in an embodiment. In other embodiments, other suitable values of the offset field indicate that the offset in the identified collision bucket is not a valid offset.

When a collision bucket having a signature matching the second hash value H2 is identified at block 408, the scheme 400 continues at block 410 at which the update unit 114b determines whether the corresponding offset can be utilized for inserting additional keys into the forwarding table 106. In an embodiment, the update unit 114b checks the collision counter field of the collision bucket identified at block 408, and determines that the corresponding offset can be utilized for inserting additional keys into the forwarding table 106 if the collision counter does not exceed a certain maximum value. For example, in an embodiment, each collision counter field includes two bits and is able to support a maximum of four keys. In this embodiment, the update unit 114b determines that an additional key can utilize the offset when the collision counter indicates that three or fewer keys are currently utilizing the offset. On the other hand, when the collision counter field indicates that the maximum number of keys that can be accommodated by the collision bucket have already been inserted into the forwarding table 106 (e.g., a value of four in the collision counter field), the update unit 114b determines that an additional key cannot be inserted into the forwarding table 106.

A block 412, when it is determined that an additional key can be inserted, the update unit 114b applies the corresponding offset to the third hash value generated at block 404, and utilizes the third hash value with the offset to as an index into the forwarding table 106. At block 414, the update unit 114b determines whether the indexed entry in the forwarding table 106 is empty (i.e., available). Referring to FIG. 4B, when it is determined that the indexed entry is available, the scheme 400 continues at block 424, at which the update unit 114b inserts the key X (and the information associated with the key X) into the entry in the forwarding table 106. Because, in this case, an offset already associated with a valid collision bucket, having a collision counter value greater than zero (0), was used to inset the key, the lookup table need not be updated to indicate a new offset. Accordingly, in this case, the scheme 400 skips block 426, and continues at block 428, at which, the update unit 114b increments the collision counter field of the collision bucket identified at block 408 (e.g., in the case of the key X being the first key to be associated with the collision bucket, the update unit 114b changes the value of the counter field from a −1 to a 0) to account for the key X inserted into the forwarding table 106 at block 424.

Returning now to block 408 of FIG. 4A, when a collision bucket having a signature that matches the second hash value H2 is not identified at block 408, then the scheme 400 continues at block 418, at which the update unit 114b determines whether an unoccupied collision bucket exists in the lookup table entry accessed at block 406. If it is determined at block 418 that an unoccupied collision bucket exists, then the update unit 114b accesses the forwarding table 106 using the third hash value H3, and searches the forwarding table 106 to find an available offset from the entry indexed by the third hash value H3. In other words, the update unit 114*b* searches the forwarding table 106 for an unoccupied entry, wherein the search begins with the entry indexed by H3 and ends with and entry corresponding to the maximum offset supported by the lookup table 107, in an embodiment. If such an entry is identified, the update unit 114*b* inserts the key X (and information associated with the key X) into the identified entry at block 424. Then, at block 426, the update unit 114*b* updates the collision bucket identified at block 418 (FIG. 4A) with the offset corresponding to the entry identified at block 422. Additionally, the update unit 114*b* increments the collision counter of the collision bucket identified at block 418 to account for the key X inserted into the forwarding table 106 at block 424.

Referring again FIG. 4A, the "NO" branches of each of blocks 410, 414 and 418 lead to the block 416 at which the update unit 114*b* accesses the CAM 108 in an attempt to insert the key X into the CAM 108. At block 430 (FIG. 4B) determines whether the key X can be inserted into the CAM 108. When it is determined that the key can be inserted into the CAM 108, the update unit 114*b* inserts the key into the CAM 108 (block 432 of FIG. 4B). On the other hand, when it is determined that the key cannot be inserted into the CAM 108 (for instance, when there is no empty space in the CAM), the insertion of the key X has failed.

Figure 4C:
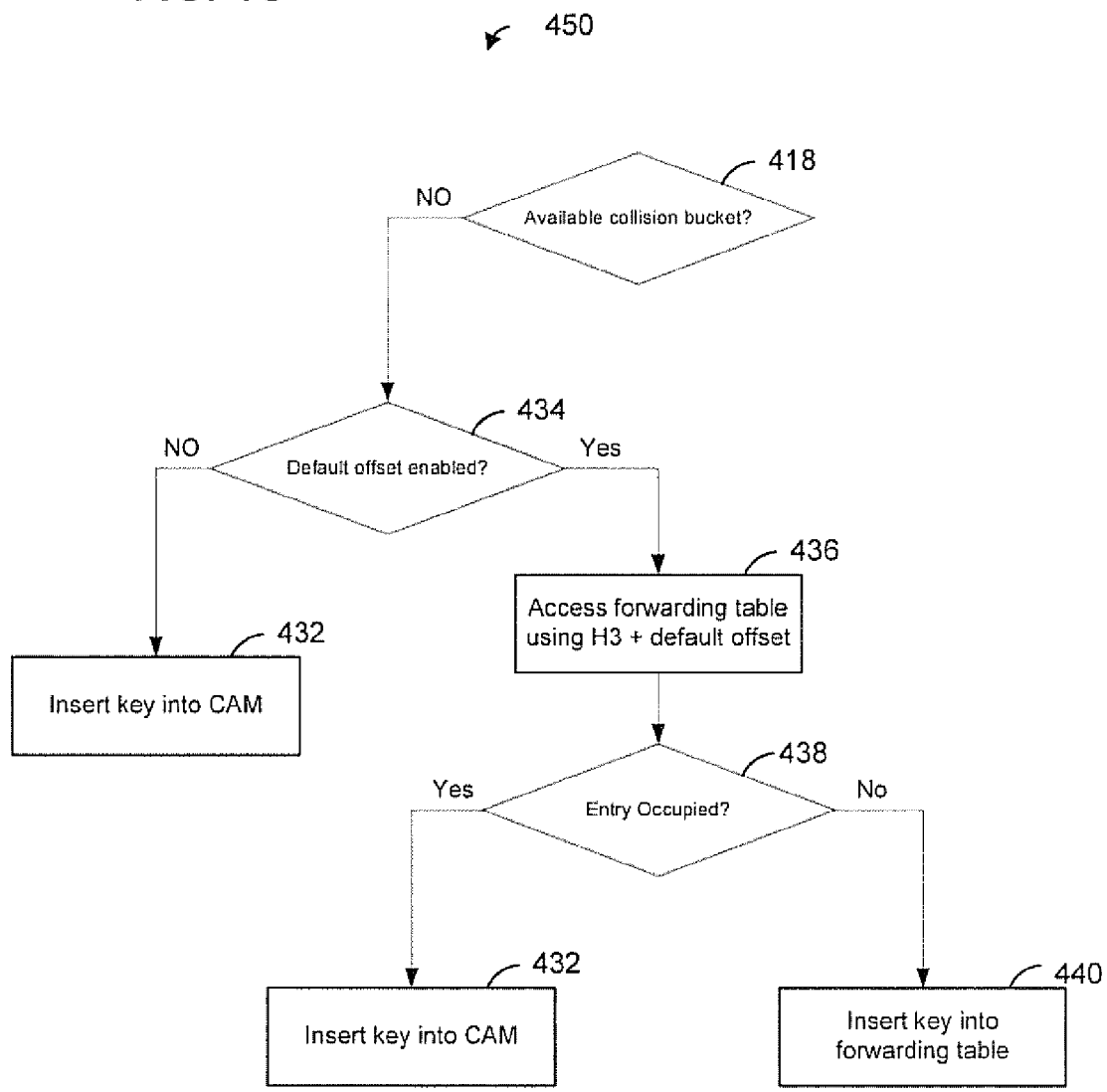
FIG. 4C is a flow diagram illustrated a collision resolution scheme implemented in conjunction with the update technique of FIGS. 4A-4B, according to an embodiment.

FIG. 4C is a flow diagram illustrating a collision resolution scheme 450 implemented in conjunction with the update technique 400 of FIG. 4A-4B in some embodiments. The scheme 450 includes some blocks that are common blocks of the technique 400, and these blocks are referenced by like-numbered blocks with respect to the corresponding blocks of FIGS. 4A-4B (e.g., the block 432). In the scheme 450, insertions into the forwarding table 107 using a default offset are supported, in an embodiment. In an embodiment, the default offset is configurable. In other embodiments, the default offset is pre-set or pre-determined and is not configurable.

The collision resolution scheme 450 begins at block 418 which corresponds to the block 418 of FIG. 4A. When it is determined at block 418 that no available (unused) collision bucket exists in the lookup table entry identified at block 408, rather than proceeding to block 432 as is done in accordance with the scheme 400, the scheme 450 proceeds to block 434, at which it is determined whether a default offset is enabled. If it is determined at block 434 that default offset is not enabled, the scheme 450 proceeds to the block 432 at which insertion of the key into the CAM 108 is attempted in accordance with the scheme 400. On the other hand, when it is determined at block 434 that default offset is enabled, then the scheme 450 continues at block 436 at which the default offset is applied to the third hash value H3 to determine an index for the forwarding table 106, and the forwarding table 106 is accessed using the determined index.

At block 438, it is determined whether the entry accessed at block 436 is occupied. When it is determined at block 438 that the entry is occupied, then the scheme 450 continues at block 432 at which insertion into the CAM 108 is attempted. However, when it is determined at block 438 that the entry accessed at block 436 is not occupied, the key X is inserted into the forwarding table 106 at the entry accessed at block 436. In this case, according to the scheme 450, the key X is inserted into the forwarding table 106 even though all collision buckets associated with the first hash value for the key X are already occupied by keys having signatures that do not match the signature of the key X, in at least some situations. In effect, such keys are learned "outside" of the lookup table 106, in an embodiment.

In an embodiment, implementation of the scheme 450 is aided by the processor 120 and the memory 122 of FIG. 1. In particular, to prevent consequent lookup errors for the keys learned outside of the lookup table 106, in this embodiment, the processor 120 stores signatures of such keys in a memory (e.g., in the memory 122 or in another memory coupled to the processor 120). A subsequent lookup error may occur, for example, when a collision bucket corresponding to the first hash value H1 of the key X in the lookup table 107 subsequently becomes available (e.g., due to deletion of keys previously associated with this collision bucket), and is then utilized for other keys having the second hash value H2 that matches the second hash value H2 of the key X. This will result in unsuccessful lookups subsequently performed for the key X because the forwarding table entry in which X is stored will no longer be accessed during lookup. To prevent this scenario, in an embodiment, the processor 120 checks stored signatures of keys learned outside of the lookup table 106 and prevents a signature that matches a stored signature to be subsequently written into the lookup table 106. Instead, in such situations, the processor 120 causes the update unit 114*b* to access the forwarding table 106 using third hash values H3 corresponding to the key, for example, in an embodiment.

Referring again to FIG. 1, in some embodiments, to further improve memory utilization of the forwarding table 107, the processor 120 executes instructions stored in the memory 122 to implement a technique, such as a hopscotch hashing based technique, that rearranges entries in the forwarding table 106 to thereby allow insertion of at least some lookup keys that could not otherwise have been inserted into the forwarding table 106, in some situations. FIGS. 5A-5B are diagrams illustrating a scheme 500 to rearrange entries in a database table 510, according an example embodiment. In an embodiment, the scheme 500 is implemented in the forwarding engine 104 (e.g., by the processor 120) to rearrange entries in the forwarding table 106. In this embodiment, the scheme 500 is implemented in conjunction with the lookup table 107 of FIG. 1. In an embodiment, the scheme 500 is utilized in conjunction with the update scheme 400 of FIGS. 4A-4B to rearrange entries in the forwarding table 106 to allow a lookup key to be inserted into the forwarding table 106 when the update scheme 400 is unable to insert the lookup key into forwarding table 106 due to a collision in the forwarding table 106.

In the embodiment illustrated in FIGS. 5A-5B, the table 510 is shown as having five entries 512-1 to 512-5. Although the table 510 is illustrated as having five entries, the table 510 generally includes any suitable number of entries, and the number of entries in the table 510 is more than five entries, or less than five entries, in some embodiments. Entry indices, according to the illustrated embodiment, are indicated in FIGS. 5A-5B to the right of the entries 512. In general, a lookup key is inserted into the table 500 using the third hash value H3 generated for the lookup key and an offset selected or determined for the lookup key. In an embodiment, the value of the offset is limited by a maximum offset. In the example embodiment of FIGS. 5A-5B, the maximum offset is equal to three. Accordingly, in this embodiment, a lookup key having the third hash value H3 equal to x can be inserted into the table 510 at an available (unoccupied) table entry having and index between x and x+3. In other embodiments, other suitable values of maximum offset are utilized.

Referring first to FIG. 5A, all entries 512 of the table 510 are initially empty. A first lookup key 514-1 to be inserted into the table 510 corresponds to a third hash value H3=x, and is inserted into the table 510 with an offset of 0 (i.e., at the table entry indexed by the value x). A second lookup key 514-2 to be inserted into the table 500 corresponds to a third hash value H3=x, and is inserted into the table 510 with an offset of 1 (i.e., at the table entry indexed by the value x+1). A third lookup key 514-3 to be inserted into the table 510 corresponds to a third hash value H3=x+1, and, because the entry indexed by the value of x+1 is already occupied by the second lookup key 514-2, is inserted into the table 510 with an offset of 1 (i.e., at the table entry indexed by the value x+2). A fourth lookup key 514-4 to be inserted into the table 500 corresponds to a third hash value H3=x, and is inserted into the table 500 with an offset of 3 (i.e., at the entry indexed by the value x+2).

A fifth lookup key 514-5 to be inserted into the table 510 corresponds to a third hash value H3=x. The lookup key 514-5 cannot be inserted into the table 510 because all entries within the range of entries into which keys having H3=x can be inserted (i.e., entries between x and x+3) are currently occupied by other keys. As illustrated in FIG. 5B, in an embodiment, the third lookup key 514-3 is then moved to the empty entry indexed by x+4, and the offset associated with the third lookup key 514-3 is changed to the value of 3, thereby allowing the fifth lookup key 514-5 to be inserted into the table 510 at the location indexed by x+2. Accordingly, the fifth lookup key 514-5 is then inserted into the table 510 with an offset of 3 at the location indexed by x+2. Further, a lookup table entry (e.g., a collision bucket in the lookup table 107 of FIG. 1) associated with the lookup key 514-3 is updated to reflect the new offset used for the lookup key 514-3, in an embodiment.

In an embodiment, to avoid updating offsets with which other lookup keys are also associated, prior to moving the lookup key 514-3, a collision bucket associated with the lookup key 514-3 is checked to ensure that no other lookup key is associated with the corresponding offset. For example, when a value of a collision counter associated with the lookup key 514-3 indicates that the lookup key 514-3 is the only key associated with the corresponding offset (e.g., a value of collision counter equal to 0), the lookup key 514-3 is moved to the location indexed by x+4, and the offset field is updated accordingly to correspond to the new location indexed by x+4. However, in an embodiment, when the value of the collision counter indicates that one or more other keys are associated with the corresponding offset (e.g., a value of collision counter greater than 0), then the lookup key 514-3 is not moved to a new location. In this case, a different lookup key, one associated with a collision counter indicating that the lookup key is the only key associated with the corresponding offset, is moved to a new location to allow insertion of the lookup key 515-5, in some embodiments and/or scenarios. That is, in this embodiment, relocation of lookup keys is limited to only relocating a lookup key if the lookup key is the only lookup key associated with a particular collision bucket, e.g., as indicated by a value of 0 of the corresponding collision counter associated with the collision bucket.

Alternatively, in another embodiment in which the value of the collision counter with which the lookup key 514-3 is associated indicates that one or more other keys are associated with the corresponding offset (e.g., a value of collision counter greater than 0), all of the lookup keys associated with the collision bucket, including the look-up key 514-3, are moved to new locations, and the lookup key 514-5 is inserted into the table 510 at the former location of the lookup key 514-3. Further, respective offsets associated with the relocated lookup keys are updated, e.g. in the lookup table 107 of FIG. 1, to properly reflect the new locations of the relocated lookup keys, in this embodiment.

Figure 6:
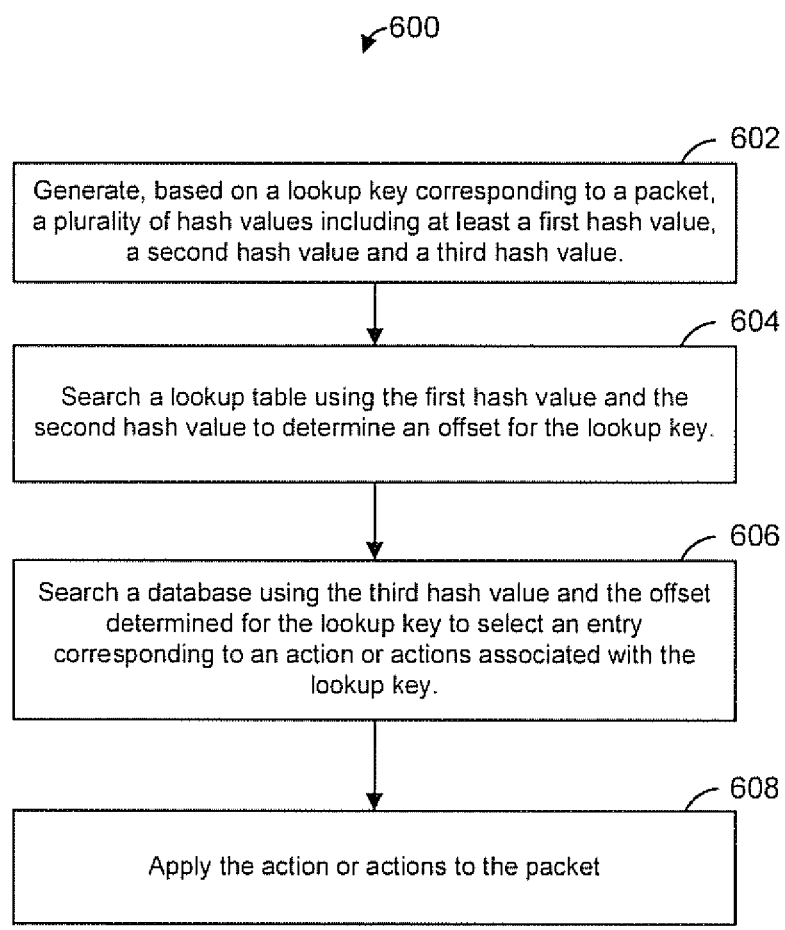
FIG. 6 is a flow diagram of an example method for forwarding packets in a network device, according to an embodiment.

FIG. 6 is a flow diagram of an example method 600 for performing an action or a set of actions on a packet, such as forwarding a packet, in a network device, according to an embodiment. In an embodiment, the method 600 is implemented by the switching device 100 of FIG. 1. For example, the method 600 is implemented at least partially by the forwarding engine 104 of FIG. 1, in an embodiment. In other embodiments, the method 600 is implemented by other suitable components of the switching device 100 or by another suitable network device.

At block 602, a plurality of hash values is generated based on a lookup key corresponding to a packet. In an embodiment, the hash values are generated by the hash value generator 110 of FIG. 1. In other embodiments, the hash values are generated by other suitable components of the switching device 100 or by another suitable switching device. In an embodiment, the lookup key corresponding to the packet includes various information included in or associated with the packet. For example, the lookup key includes one or more of a destination MAC address and a WLAN tag, etc. In other embodiments, the lookup key includes other suitable information included in or associated with a packet.

At block 604, a lookup table is searched using the first hash value and the second hash value generated at block 602. In an embodiment, the lookup table 107 of FIG. 1 is searched. In another embodiment, another suitable lookup table is searched. In an embodiment, the lookup table includes entries structured as the entry 200 of FIG. 2. In other embodiments, the lookup table includes entries structured in other suitable manners. In an embodiment, an entry in the lookup table is identified based on the first hash value, and the identified entry is searched using the second hash values to select a sub-entry of the identified entry corresponding to the second has value.

At block 606, a suitable network device database, such as a forwarding table, is searched using the third hash value and the offset determined at block 604. In an embodiment, the forwarding table 106 is searched. In another embodiment another forwarding table or a suitable database other than a forwarding table is searched. In an embodiment, searching the database includes applying the offset to the third hash value to determine an index into the database, accessing the database to retrieve an entry corresponding to the determined index. In an embodiment, the retrieved entry includes information for performing one or more actions on the packet. For example, the retrieved entry is a forwarding entry that indicates how (e.g., to which port) the packet should be forwarded, in an embodiment. In other embodiments, the retrieved entry indicates information regarding one or more actions other than forwarding the packet, such as information regarding filtering to be applied to the packet, information regarding an action or a set of actions associated with Quality of Service (QoS) processing of the packet, information related to gathering statistics in the network device, etc. At block 608, the action or actions indicated by the entry retrieved at block 606 are applied to the packet. For example, in a forwarding database application, the packet is forwarded to a port of the network device based on the forwarding entry selected at block 606, in an embodiment.

In other embodiments, other suitable action or actions based on the entry retrieved at block 606 are applied to packet at block 608.

Figure 7:
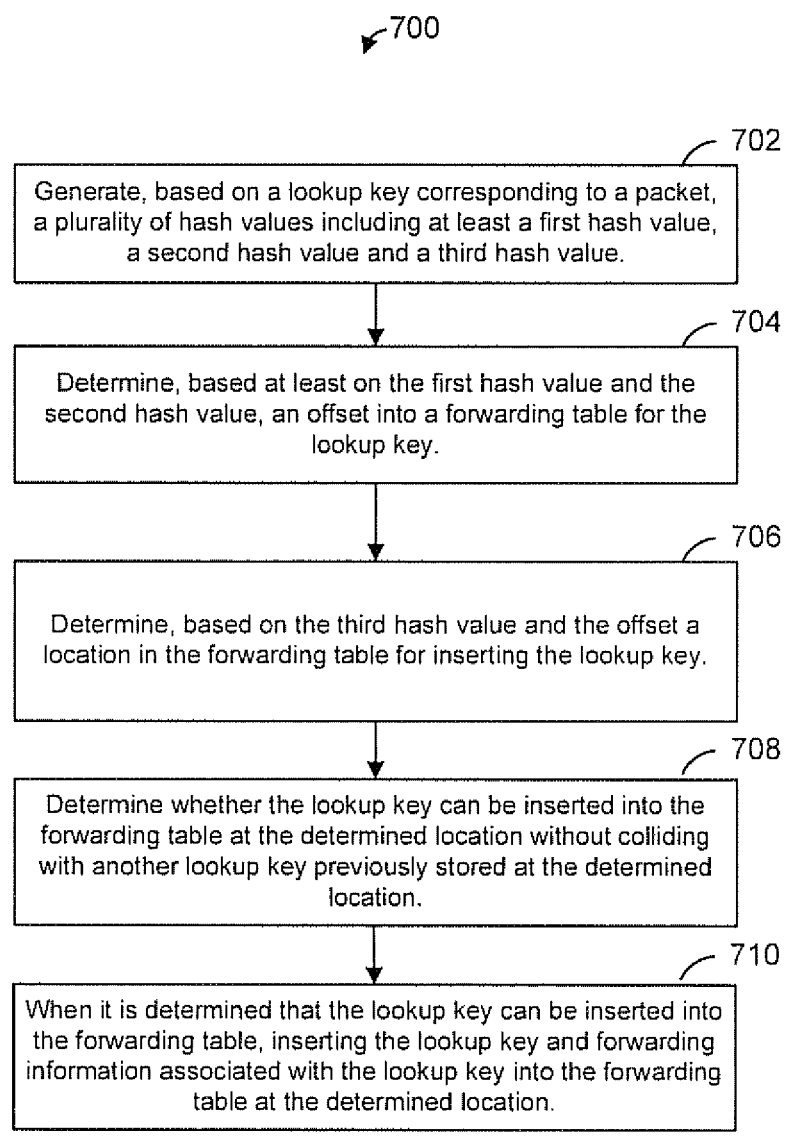
FIG. 7 is a flow diagram of an example method for populating a forwarding database in a network device, according to an embodiment.

FIG. 7 is a flow diagram of an example method 700 for populating a forwarding database in a network device, according to an embodiment. In an embodiment, the method 700 is implemented by the switching device 100 of FIG. 1. For example, the method 700 is implemented at least partially by the forwarding engine 104 of FIG. 1, in an embodiment. In other embodiments, the method 700 is implemented by other suitable components of the switching device 100 or by another suitable network device.

At block 702, a plurality of hash values is generated based on a lookup key corresponding to a packet. In an embodiment, the hash values are generated by the hash value generator 110 of FIG. 1. In other embodiments, the hash values are generated by other suitable components of the switching device 100 or by another suitable switching device. In an embodiment, the lookup key corresponding to the packet includes various information included in or associated with the packet. For example, the lookup key includes one or more of a destination MAC address and a VLAN tag, etc. In other embodiments, the lookup key includes other suitable information included in or associated with a packet.

At block 704, an offset into the forwarding table is determined based at least on the first hash value and the second hash value. In an embodiment, determining the offset includes accessing a lookup table to determine if an offset associated with the first hash value and the second hash value already exists in the lookup table. In an embodiment, determining the offset includes accessing the lookup table 107 of FIG. 1 having entries structured as the entry 200 of FIG. 2. In another embodiment, determining the offset includes accessing another suitable lookup table. When an offset associated with the first hash value and the second hash value already exists in the lookup table, the offset is set to the offset retrieved from the lookup table, in an embodiment. The offset is then applied to the third hash value to determine an index into a forwarding table (e.g., the forwarding table 106 of FIG. 1, or another suitable forwarding table). If an offset associated with the first hash value and the second hash value does not yet exists in the lookup table, the forwarding table is accessed using the third hash value and an available offset in the forwarding table is determined when such an available offset exists in the forwarding table. In an embodiment, if an available offset does not exist in the forwarding table (e.g., limited by a maximum offset value), entries in the forwarding table are rearranged according to a suitable rearranging technique, such as the technique 500 of FIGS. 5A-5B. In this case, the offset is determined to be an offset that becomes available as a result of the rearrangement, in an embodiment. In an embodiment, when the lookup table cannot support insertion of an additional key having the first hash value, the offset is set to a default offset. These database population techniques efficiently resolve various collisions that may result during insertion of a key into the forwarding table, thereby increasing memory utilization of the lookup table, in at least some embodiments.

At block 706, a location in the forwarding table is determined based on the third hash and the offset determined at block 706. At block 708, it is determined whether the lookup key can be inserted onto the determined locations without colliding with another lookup key previously stored in the forwarding table. When it is determined that the lookup key can be inserted at the determined location in the forwarding table, the lookup key and information associated with the lookup key is inserted at the determined location at block 710.

In an embodiment, when it is determined at block 708 that the lookup key cannot be inserted onto the determined locations without colliding with another lookup key previously stored in the forwarding table, additional memory, such as a CAM (e.g., the CAM 108 of FIG. 1) is accessed to determine whether the additional memory can accommodate the lookup key. When it is determined the additional memory can accommodate the lookup key, the lookup key (and, in some embodiments, forwarding information associated with the lookup key) is stored in the additional memory. In some embodiments, when the additional memory cannot accommodate the lookup key, insertion of the lookup key fails. In an embodiment, insertion techniques according to the method 700 increase utilization of the forwarding table and decrease probability of failed insertions, in at least some situations.

The various blocks, operations, etc., described above with respect to FIGS. 2-4 may be implemented in hardware, such as in one or more custom integrated circuits, application specific integrated circuits (ASICs), field programmable gate arrays (FPGAs), etc. The various blocks, operations, etc., described above with respect to FIG. 5 may be implemented, in whole or in part, using a processor executing machine readable software and/or firmware instructions.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A method for populating a forwarding database in a network device, the method comprising:
generating, at a hash value generator and based on a lookup key that includes packet header information, a plurality of hash values corresponding to a packet, including generating at least (i) a first hash value at least by applying a first hash function to the lookup key, (ii) a second hash value at least by applying a second hash function to the lookup key and (iii) a third hash value at least by applying a third hash function to the lookup key, the third hash function being different than the first hash function and the second hash function;
determining, with the network device and based at least on the first hash value and the second hash value, an offset, into a forwarding table, for the lookup key;
determining, with the network device and based on the third hash value and the offset, a location in the forwarding table for inserting the lookup key;
determining, with the network device, whether the lookup key can be inserted into the forwarding table at the determined location without colliding with a key previously stored at the determined location; and
when it is determined that the lookup key can be inserted into the forwarding table, inserting the lookup key and forwarding information associated with the lookup key into the forwarding table at the determined location.

2. The method of claim 1, wherein determining, based on the first hash value and the second hash value, the offset, into the forwarding table, for the lookup key includes:

identifying, based on the first hash value, a lookup table entry, wherein the lookup table entry includes a plurality of collision buckets associated with the first hash value; and using the second hash value to select, for determining the offset, one collision bucket of the plurality of collision buckets.

3. The method of claim 2, wherein each collision bucket in the lookup table entry includes a respective signature field and a respective offset field, and wherein determining the offset comprises:

comparing the second hash value to respective signature fields of at least some collision buckets in the identified lookup table entry;

when the second hash value matches a value of a signature field of one of the collision buckets, retrieving the offset from the offset field of the one collision bucket; and when the second hash value does not match any of the signature fields in the identified lookup table entry, searching the forwarding table using the third hash function as an index into the forwarding table to locate an available entry in the forwarding table, and performing one of (i) when searching the forwarding table locates an available entry in the forwarding table, setting the offset to a value of offset of the available entry in the forwarding table with respect a table entry indexed by the third hash function value, or (ii) when searching the forwarding table does not locate an available entry in the forwarding table, setting the offset to a default offset value.

4. The method of claim 3, wherein searching the forwarding table using the third hash function as the index into the forwarding table to locate the available entry in the forwarding table includes locating the available entry within a maximum offset from the index, and wherein determining the offset further comprises rearranging entries in the forwarding table when searching the forwarding table does not locate the available entry in the forwarding table, wherein rearranging of entries results in an available entry within the maximum offset.

5. An apparatus for populating a forwarding database in a network device, comprising:

a hash value generator configured to generate, based on a lookup key that includes packet header information, a plurality of hash values, including at least (i) a first hash value generated at least by applying a first hash function to the lookup key, (ii) a second hash value generated at least by applying a second hash function to the lookup key, and (iii) a third hash value generated at least by applying a second hash function to the lookup key, the third hash function being different than the first hash function and the second hash function; and an update unit configured to determine, based on at least the first hash value and the second hash value, an offset into a forwarding table for the lookup key, determine, based on the third hash value and the offset determined for the lookup key, a location in the forwarding table for inserting the lookup key, determine whether the lookup key can be inserted into the forwarding table at the determined location without colliding with keys previously stored at the determined location, and when it is determined that the lookup key can be inserted into the forwarding table, insert the lookup key and forwarding information associated with the lookup key into the forwarding table at the determined location.

6. The apparatus of claim 5, wherein the update unit is configured to:

identify, based on the first hash value, a lookup table entry, wherein the lookup table entry includes a plurality of collision buckets associated with the first hash value, and select, based on the second hash value, one of the collision buckets for determining the offset.

7. The apparatus of claim 5, wherein each collision bucket in the lookup table entry includes a signature field and an offset field, and wherein the update unit is configured to:

compare the second hash value to respective signature fields of at least some collision buckets in the identified lookup table entry, when the second hash value matches a value of a signature field of one of the collision buckets, set the offset to a value of the offset field of the one collision bucket, and when the second hash value does not match any of the signature fields in the identified lookup table entry, search the forwarding table using the third hash function as an index into the forwarding table to locate an available entry in the forwarding table, and perform one of (i) when searching the forwarding table locates an available entry in the forwarding table, set the offset to a value of offset of the available entry in the forwarding table with respect a table entry indexed by the third hash function value, or (ii) when searching the forwarding table does not locate an available entry in the forwarding table, set the offset to a pre-determined global offset value.

8. The apparatus of claim 7, wherein the update unit is configured to locate the available entry within a maximum offset from the index, and wherein the forwarding engine is further configured rearrange entries in the forwarding table when searching the forwarding table does not locate the available entry in the forwarding table, wherein rearranging of entries results in an available entry within the maximum offset.

* * * * *